United States Patent
Croak et al.

(10) Patent No.: US 9,823,087 B2
(45) Date of Patent: *Nov. 21, 2017

(54) METHOD AND APPARATUS FOR PROVIDING TRAFFIC INFORMATION ASSOCIATED WITH MAP REQUESTS

(71) Applicant: AT&T Intellectual Property II, L.P., Atlanta, GA (US)

(72) Inventors: Marian Croak, Fair Haven, NJ (US); Hossein Eslambolchi, San Diego, CA (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,245

(22) Filed: Jun. 6, 2016

(65) Prior Publication Data

US 2016/0282134 A1 Sep. 29, 2016

Related U.S. Application Data

(63) Continuation of application No. 14/507,577, filed on Oct. 6, 2014, now Pat. No. 9,360,327, which is a continuation of application No. 12/545,601, filed on Aug. 21, 2009, now Pat. No. 8,855,908, which is a continuation of application No. 11/261,696, filed on Oct. 28, 2005, now Pat. No. 7,580,792.

(51) Int. Cl.
| | | |
|---|---|---|
| *H04W 80/04* | (2009.01) | |
| *G01C 21/36* | (2006.01) | |
| *G08G 1/0967* | (2006.01) | |
| *G08G 1/0968* | (2006.01) | |
| *G01C 21/26* | (2006.01) | |
| *H04W 88/08* | (2009.01) | |
| *H04L 29/08* | (2006.01) | |

(52) U.S. Cl.
CPC ......... *G01C 21/3667* (2013.01); *G01C 21/26* (2013.01); *G08G 1/09675* (2013.01); *G08G 1/096716* (2013.01); *G08G 1/096775* (2013.01); *G08G 1/096811* (2013.01); *G08G 1/096844* (2013.01); *H04L 67/18* (2013.01); *H04W 88/08* (2013.01)

(58) Field of Classification Search
CPC ............ G01C 21/26; G08G 1/096716; G08G 1/096775; G08G 1/096811; G08G 1/096844; H04W 88/08
See application file for complete search history.

(56) References Cited

U.S. PATENT DOCUMENTS

| | | |
|---|---|---|
| 5,689,252 A | 11/1997 | Ayanoglu et al. |
| 5,892,463 A | 4/1999 | Hikita et al. |
| 6,317,684 B1 | 11/2001 | Roeseler et al. |
| 6,324,466 B1 | 11/2001 | Vieweg et al. |
| 6,408,243 B1 | 6/2002 | Yofu |
| 6,515,595 B1 | 2/2003 | Obradovich et al. |
| 6,708,111 B2 | 3/2004 | Park |
| 6,922,629 B2 | 7/2005 | Yoshikawa et al. |

(Continued)

*Primary Examiner* — Andrew Lee

(57) ABSTRACT

A method and apparatus for enabling users who request a map of a specified route to invoke a data session to see images of the key markers and a video session to see live views of key points along the route are disclosed. If traffic appears congested, the subscriber can request an alternative route from the network along with image and video sessions to verify the traffic conditions of the alternative route.

20 Claims, 5 Drawing Sheets

(56) References Cited

U.S. PATENT DOCUMENTS

| | | |
|---|---|---|
| 7,076,505 B2 | 7/2006 | Campbell |
| 7,193,528 B2 | 3/2007 | Hanebrink |
| 7,376,509 B2 | 5/2008 | Endo et al. |
| 7,483,788 B2 | 1/2009 | Tomita et al. |
| 2002/0181506 A1 | 12/2002 | Loguinov |
| 2003/0013438 A1 | 1/2003 | Darby |
| 2003/0054810 A1 | 3/2003 | Chen et al. |
| 2004/0098748 A1 | 5/2004 | Bo et al. |
| 2004/0172192 A1 | 9/2004 | Knutson |
| 2005/0030940 A1 | 2/2005 | Abrol et al. |
| 2005/0096840 A1 | 5/2005 | Simske |
| 2005/0138372 A1 | 6/2005 | Kajihara et al. |
| 2006/0045030 A1 | 3/2006 | Bieselin |
| 2006/0184531 A1 | 8/2006 | Russlies |
| 2006/0284879 A1 | 12/2006 | Nagata et al. |
| 2006/0293850 A1 | 12/2006 | Ahn et al. |
| 2007/0147315 A1 | 6/2007 | Khoury et al. |
| 2007/0233384 A1 | 10/2007 | Lee |
| 2008/0021639 A1 | 1/2008 | Inukai |

200

METHOD AND APPARATUS FOR PROVIDING TRAFFIC INFORMATION ASSOCIATED WITH MAP REQUESTS

This application is a continuation of U.S. patent application Ser. No. 14/507,577, filed Oct. 6, 2014, now U.S. Pat. No. 9,360,327, which is a continuation of U.S. patent application Ser. No. 12/545,601, filed Aug. 21, 2009, now U.S. Pat. No. 8,855,908, which is a continuation of U.S. patent application Ser. No. 11/261,696, filed Oct. 28, 2005, now U.S. Pat. No. 7,580,792, all of which are herein incorporated by reference in their entirety.

BACKGROUND OF THE INVENTION

The present invention relates generally to communication networks and, more particularly, to a method and apparatus for providing traffic information associated with map requests in communication networks, e.g., Service over Internet Protocol (SoIP) networks.

As extremely high bandwidth access networks become more accessible to residential subscribers, they enable service providers of these networks to integrate voice, video, and data, thereby providing more convenience for end customers and creating new service opportunities. Due to the multi-service nature of these new services, networks need to provide additional functionalities to end customers to support integrated control of these different types of services. For instance, a subscriber may use the network to get driving directions from one place to another. However, the directions obtained do not contain any information about the current traffic conditions along the recommended routes.

Therefore, a need exists for a method and apparatus for providing traffic information associated with map requests in a packet network, e.g., a SoIP network.

SUMMARY OF THE INVENTION

In one embodiment, the present invention enables users who request a map of a specified route to invoke a data session to see images of the key markers along the route, such as important turns or landmarks, and a video session to see live views of the traffic conditions associated with key points in the map, such as bridges, freeways, entry and exit ramps. If traffic appears congested, the subscriber can request an alternative route from the network along with image and video sessions to verify the traffic conditions of the alternative route.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
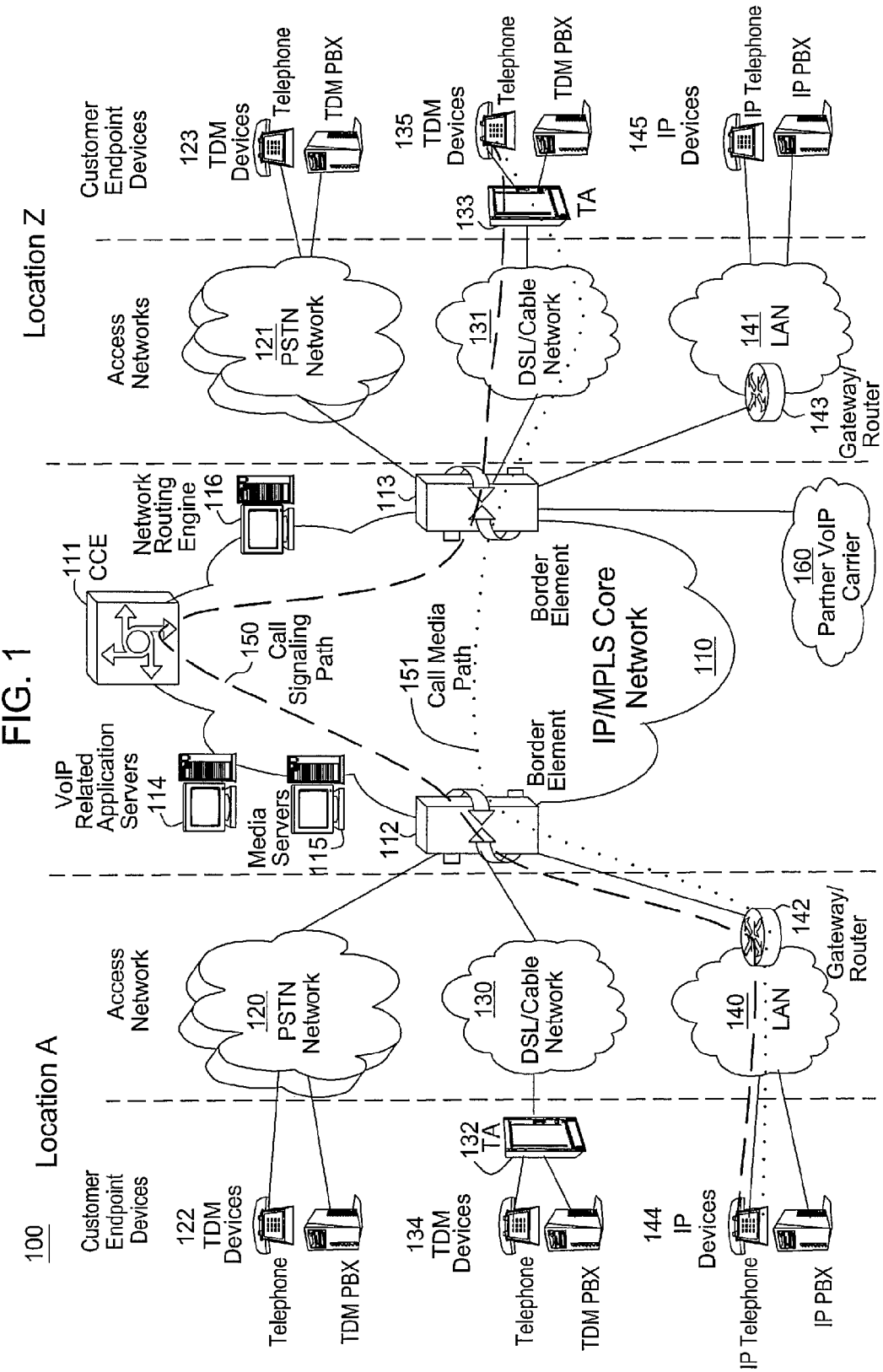
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions.

The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
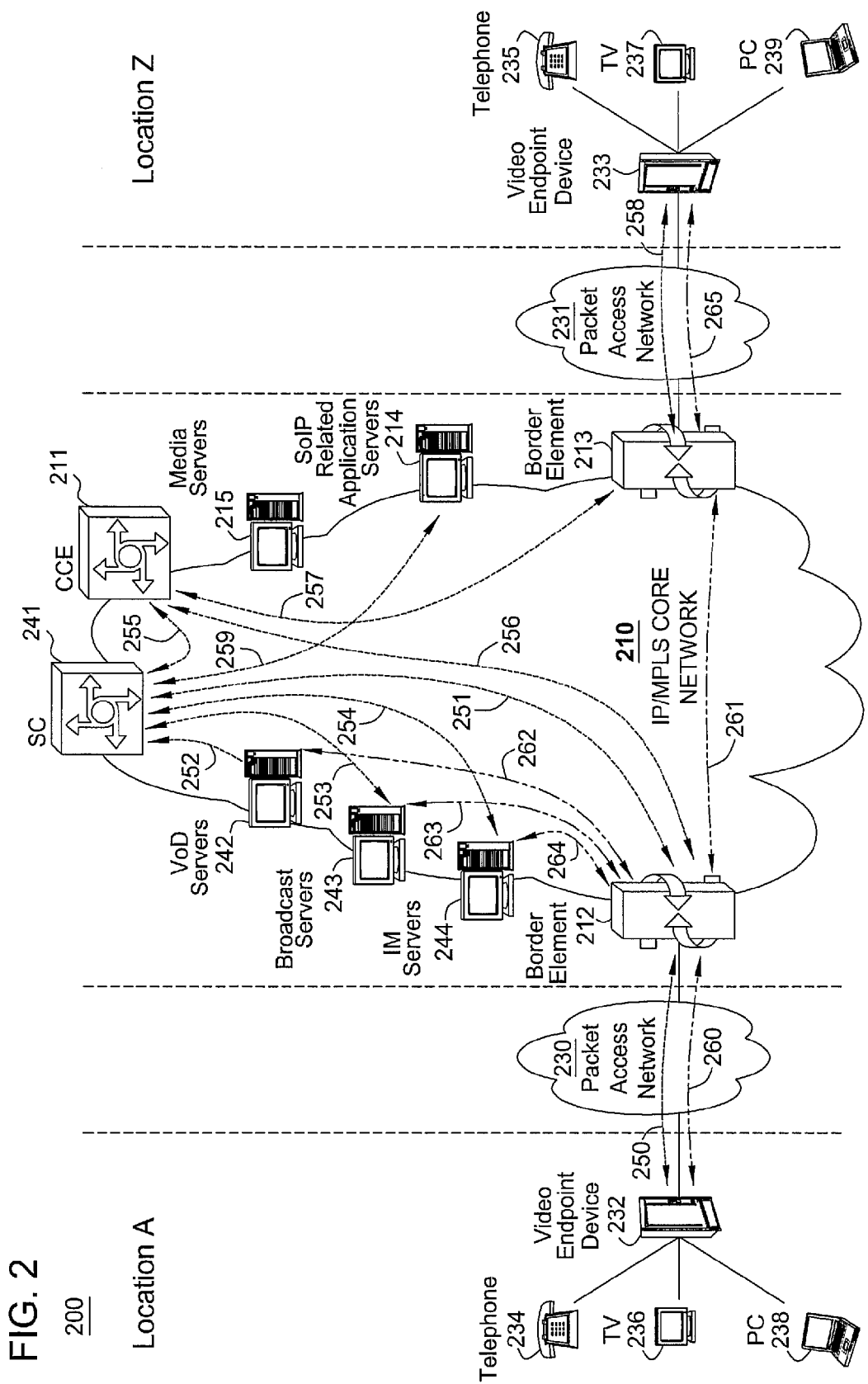
FIG. 2 illustrates an exemplary Service over Internet Protocol (SoIP) network related to the present invention.

The network shown in FIG. 1 can be extended to become a SoIP network that supports multi-service applications including, but not limited to, video services. FIG. 2 illustrates a communication architecture 200 having an example network, e.g., a packet network such as a SoIP network related to the present invention. A SoIP network supports multi-service applications including voice, data, and video services. In one embodiment, a SoIP network that supports video services is described below. In this SoIP network, voice services supported include, but are not limited to, VoIP services; data services supported include, but are not limited to, Instant Messaging (IM), electronic mail (email), internet access services, or any other IP based applications; and video services include, but are not limited to, Video on Demand (VoD), broadcast video, and video conferencing services.

A SoIP network that supports video services comprises an intelligent multi-service endpoint device connected via packet access networks to a service provider's SoIP core infrastructure employing Internet Protocol (IP) and/or Multi-Protocol Label Switching (MPLS) Protocols. Broadly defined, a SoIP network is a network that is capable of carrying voice, video, and data signals as packetized data over an IP network. The present invention is described below in the context of an illustrative SoIP network that supports video services. Thus, the present invention should not be interpreted to be limited by this particular illustrative architecture.

Video endpoint device 232 and 233 are IP based intelligent multi-service endpoint device supporting voice, video, and data applications. Video endpoint device 232 and 233 are signaling endpoints of application sessions, e.g. a VoIP session endpoint, an instant messaging endpoint, or a video session endpoint. In one embodiment, a video endpoint device is a standalone device that can be connected to home electronic appliances such as, but is not limited to, telephone 234 and 235, TV 236 and 237, or Personal Computer (PC) 238 and 239. In another embodiment, a video endpoint device can be integrated with a TV, a PC, or any home appliances with a display.

The access networks are packet based. Packet based access networks 230 and 231 use, but are not limited to, Frame Relay, ATM, Ethernet, IP, DSL or Cable broadband access network technologies to interconnect a video endpoint device to a SoIP network that supports video services.

The core SoIP infrastructure that supports video services comprises of several key components, such the Border Element (BE) 212 and 213, the Call Control Element (CCE) 211, SoIP related Application Servers (AS) 214, Media Servers (MS) 215, Session Controller (SC) 241, Video of Demand (VoD) Servers 242, Broadcast Servers (242), and Instant Messaging (IM) Servers 243. A BE resides at the edge of the SoIP core infrastructure and interfaces with customers endpoints over various types of access networks. The functions supported by a BE include those supported by a BE as previously described in network 100 and FIG. 1. In addition, in a SoIP network that supports video services, a BE also serves as a gateway between a video endpoint device used by a subscriber and the SoIP core network that supports video services. All application sessions initiated by a SoIP subscriber must gain entry to the SoIP core network via a BE. The functions supported by a CCE and a MS are the same as those previously described in network 100 and FIG. 1. A Session Controller (SC) resides within the SoIP infrastructure and is connected to the BEs using an IP based signaling protocol such as, but is not limited to, Session Initiation Protocol (SIP). A SC is responsible for setting up all application session requests, such as VoIP call requests, video session requests, or data session requests, originated by a customer within the network and interacts with, if necessary, the appropriate SoIP related AS in order to complete an application session that requires certain service specific features originated by a customer. A SC also keeps track of all sessions initiated by a customer for session management and billing purposes as well. The functions supported by a SoIP related AS include those supported by a VoIP AS as previously described in network 100 and FIG. 1. In addition, a SoIP AS also supports all video specific application features. A VoD Server is responsible for supporting video on demand video session requests originated by a customer and sends the requested streaming video contents, such as a movie, to the customer. A Broadcast Server is responsible for supporting broadcast video session requested originated by a customer and sends streaming broadcast video contents, such as TV channels, to the customer. The VoD Server and the Broadcast Server sends streaming video contents to video endpoint devices using compression technologies including, but are not limited to, Moving Picture Experts Group (MPEG) 2, MPEG 4, MPEG 7, MPEG 21. An IM Server is responsible for supporting IM applications involving multiple users. Instant Messaging is a form of electronic communication that involves immediate typed text correspondence between two or more users over the Internet who are online simultaneously. IM is a text-based computer conference over the Internet between two or more people who are online at the same time.

In order to illustrate how the different components in a SoIP network operate to support video services, the following scenarios are used to illustrate how voice, data, and video sessions are setup between the SoIP network and a video endpoint. In one embodiment, a customer using video endpoint device 232 at location A places a VoD session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoD session; therefore, the request will be forwarded to VoD Server 242 using signaling path segment 252. SC 241 may interact with AS 214 using signaling path segment 259 to verify customer's subscription information or to retrieve video specific applications or data in order to complete the session request. Once the VoD session is verified, VoD Server 242 sends the requested VoD streaming contents to BE 212 using data path segment 262. BE 212 then forwards the requested VoD streaming contents to video endpoint 232 using data path segment 260. Similarly, a customer at location Z using TV 237 connected to video endpoint 233 can request a VoD session via SC 241 with streaming VoD contents sent by VoD Server 242. Note that a VoD server may be placed closer to end users in a packet access network to serve video endpoints in an alternative embodiment.

In another embodiment, a customer using video endpoint device 232 at location A places a broadcast video session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a broadcast video session for a particular premium TV channel; therefore, the request will be forwarded to Broadcast Server 243 using signaling path segment 253. SC 241 may interact with AS 214 using signaling path segment 259 to verify customer's subscription information or to retrieve video specific applications or data in order to complete the session request. Once the broadcast session is verified, Broadcast Server 243 sends the requested broadcast video streaming contents to BE 212 using data path segment 263. BE 212 then forwards the requested broadcast video streaming contents to video endpoint 232 using data path segment 260. Similarly, a customer at location Z using TV 237 connected to video endpoint 233 can request a broadcast video session via SC 241 with streaming broadcast video contents sent by Broadcast Server 243. Note that a Broadcast server may be placed closer to end users in a packet access network to serve video endpoints in an alternative embodiment.

In another embodiment, a customer using video endpoint device 232 at location A places an IM session request to the video network using PC 238. During the session initiation, a setup signaling message is sent from video endpoint device 232 to BE 212 using signaling path segment 250. BE 212 will then send a setup signaling message, including login and password information of the user, to SC 241 using signaling path segment 251. SC 241 processes the session requests and forwards the request to the appropriate server for further processing. In this case, the request to sign on an IM session; therefore, the request will be forwarded to IM Server 244 using signaling path segment 254. SC 241 may interact with AS 214 using signaling path segment 259 to verify customer's subscription information or to retrieve IM specific applications or data in order to complete the session request. Once the IM session is verified, IM Server 244 establishes the requested IM data path to video endpoint 232 via BE 212 using data path comprising data path segment 260 and 264. Similarly, a customer at location A using TV 236 connected to video endpoint 232 or a customer at location Z using PC 239 or TV 237 connected to video endpoint 233 can request an IM session via SC 241 with IM functions provided by IM Server 244.

In another embodiment, a customer using video endpoint device 232 at location A places a VoIP session request destined to video endpoint device 233 via the SoIP network that supports video services using telephone 234. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoIP session for a call destined to a called party at location Z; therefore, the request will be forwarded to CCE 211 using signaling path segment 255. CCE may interact with AS 214 using signaling path segment 259 to verify customer's subscription information or to retrieve VoIP specific applications or data in order to complete the session request. The signaling flows to establish a VoIP call between video endpoint device 232 and 233 is similar to those described previously in network 100 and FIG. 1. In one embodiment, the Application Server (AS) functions as a SIP back-to-back user agent. Since BE 213 needs to be involved in completing the call; CCE 211 sends another call setup message, such as a SIP-INVITE message if SIP is used, to BE 213 using signaling path segment 257. Upon receiving the call setup message, BE 213 forwards the call setup message, via packet access network 231 to video endpoint device 233 using signaling path segment 258. Video endpoint device 233 then identifies telephone 235 and rings that telephone. Once the call is accepted at location Z by the called party, a call acknowledgement signaling message, such as a SIP 200 OK response message if SIP is used, is sent in the reverse direction back to the CCE 211. After the CCE 211 receives the call acknowledgement message, it will then send a call acknowledgement signaling message, such as a SIP 200 OK response message if SIP is used, toward the calling party at location A using signaling path comprising signaling path segment 256 and 250 via BE 212. In addition, the CCE 211 also provides the necessary information of the call to both BE 212 and BE 213 so that the call data exchange can proceed directly between BE 212 and BE 213. CCE 211 also provides the call completion status of a VoIP call to SC 241. The call media path comprising media path segment 260, 261, and 265 are illustratively shown in FIG. 2. Note that the call signaling path and the call media path are different because once a call has been setup up between two video endpoint devices, SC 241 and CCE 211 does not need to be in the data path for actual direct data exchange.

As extremely high bandwidth access networks become more accessible to residential subscribers, they enable service providers of these networks to integrate voice, video, and data, thereby providing more convenience for end customers and creating new service opportunities. Due to the multi-service nature of these new services, networks need to provide additional functionalities to end customers to support integrated control of these different types of services. For instance, a subscriber may use the network to get driving directions from one place to another. However, the directions obtained do not contain any information about the current traffic conditions along the recommended routes.

To address this need, the present invention enables users who request a map of a specified route to invoke a data session to see images of the key markers along the route, such as important turns or landmarks, and a video session to see live views of the traffic conditions associated with key points in the map, such as bridges, freeways, entry and exit ramps. If traffic appears congested, the subscriber can request an alternative route from the network along with image and video sessions to verify the traffic conditions of the alternative route.

Figure 3:
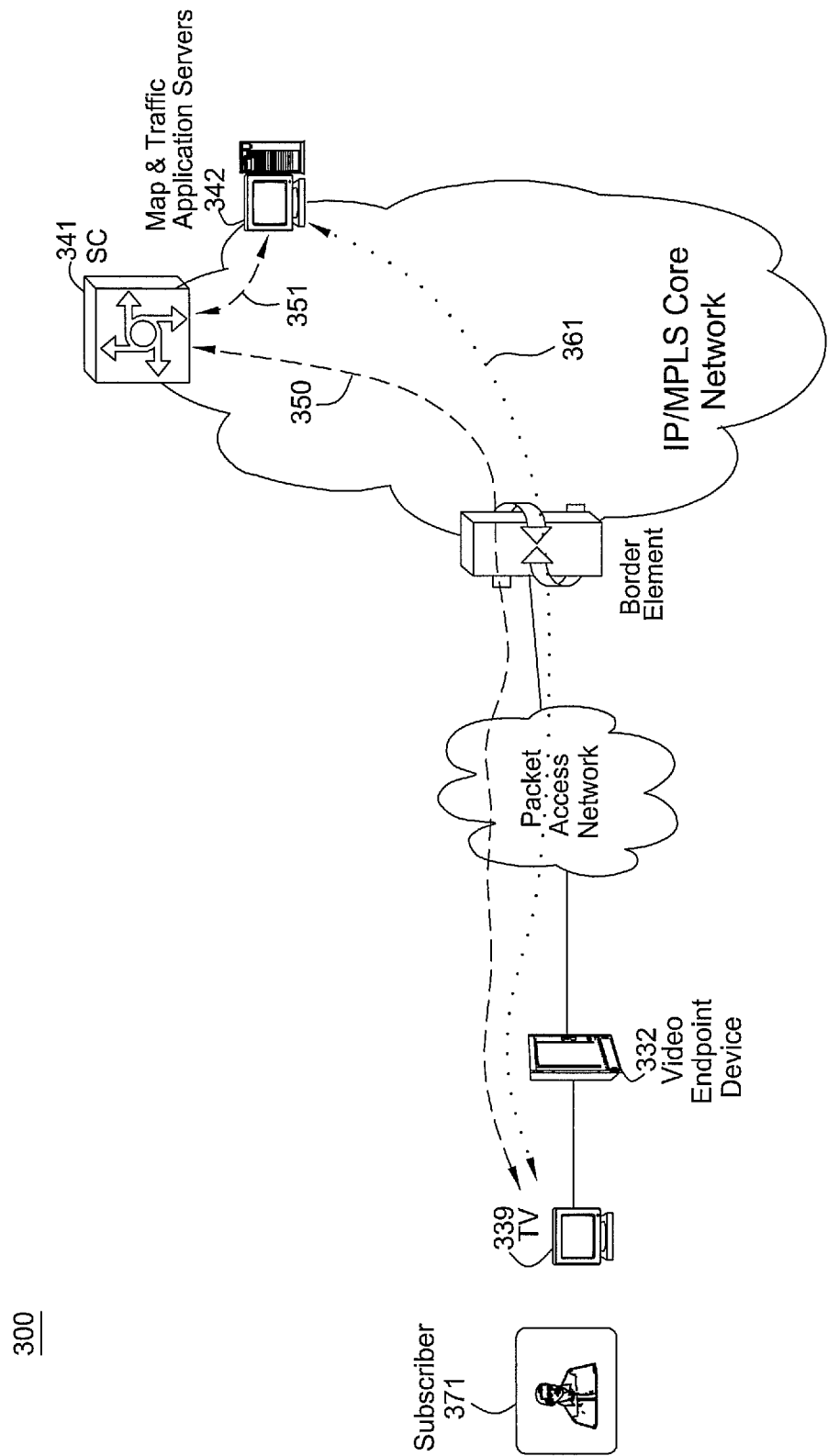
FIG. 3 illustrates an example of providing traffic information associated with map requests in a packet network, e.g., a SoIP network, of the present invention.

FIG. 3 illustrates an example 300 of providing traffic information associated with map requests in a packet network, e.g., a SoIP network, of the present invention. In FIG. 3, subscriber 371 uses TV 339 as a console to request map and traffic application session from the network. The request is sent by video endpoint device 332 to SC 341 using flow 350. Upon receiving the map and traffic application session request, SC 341 finds out that the request is a map and traffic session request and forwards the request to Map and Traffic Application Server 342 using flow 351 to establish a map and traffic application session between subscriber 371 and Map and Traffic Application Server 342.

Once the session is established, subscriber 371 can provide the source and destination pair information to Map and Traffic Application Server 342 using flow 361. Then, Map and Traffic Application Server 342 determines a primary route (e.g., a recommended route) for the map directions request based on the received source and destination pair information. Map and Traffic Application Server 342 sends the determined primary route to subscriber 371 for review. Note the returned primary route comprises key markers and key points along the determined route that can be activated by subscriber 371 to view current traffic conditions at the locations (e.g., an intersection of roads, a landmark (e.g., an airport, a bus terminal or a bus stop), a bridge, a tunnel, a freeway entry ramp, a freeway exit ramp, a toll plaza, a border crossing, and the like) represented by those key markers and key points. If subscriber 371 clicks on a key marker on the map, a current image of the location represented by the key marker will be sent to subscriber 371 using flow 361 for review. The current image is sent via a data session by Map and Traffic Application Server 342 to subscriber 371. If subscriber clicks on a key point on the map, a current live video of the location represented by the key point will be sent to subscriber 371 using flow 361 for review. The current live video is sent via a video session by Map and Traffic Application Server 342 to subscriber 371. If subscriber 371 finds out that the traffic conditions at a key marker or key point location is congested or for any other reasons, subscriber 371 can request Map and Traffic Application Server 342 to provide an alternative route instead. Then subscriber 371 can review the alternative route (e.g., a recommended route) and traffic conditions associated with the alternative route to determine the directions to use for a trip.

Figure 4:
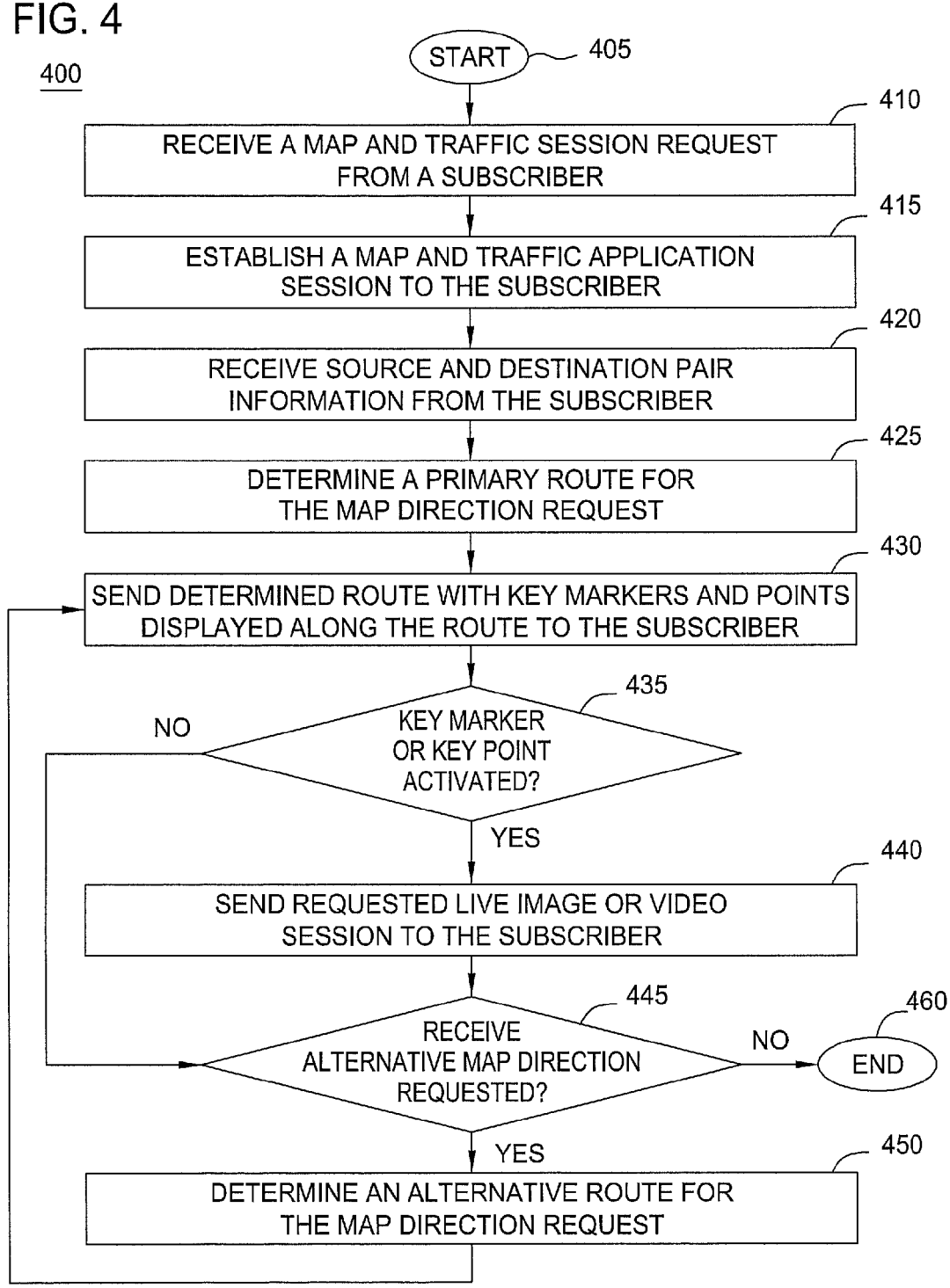
FIG. 4 illustrates a flowchart of a method for providing traffic information associated with map requests in a packet network, e.g., a SoIP network, of the present invention.

FIG. 4 illustrates a flowchart of a method 400 for providing traffic information associated with map requests in a packet network, e.g., a SoIP network, of the present invention. Method 400 starts in step 405 and proceeds to step 410.

In step 410, the method receives a map and traffic application session request from a subscriber. For example, the map and traffic application request is received by a SC.

In step 415, the method establishes a map and traffic application session to the subscriber. The SC forwards the request to a Map and Traffic Application Server to establish the requested session between the subscriber and the Map and Traffic Application Server.

In step 420, the method receives the source and destination pair information (e.g., a source location and a destination location) of a route from the subscriber. The source and destination pair information is received by the Map and Traffic Application Server.

In step 425, the method determines a primary route for the map directions request. The primary route is determined by the Map and Traffic Application Server.

In step 430, the method sends the determined route map comprising key markers and/or key points along the route to the subscriber. The determined route map is sent by the Map and Traffic Application Server and is displayed in an independent display frame on a video display device currently used by the subscriber.

In step 435, the method checks if a key marker or a key point displayed along the determined route is activated by the subscriber. The activation of a key marker or a key point is received by the Map and Traffic Application Server. A key marker or a key point can be activated by clicking the marker or point using a pointer device, such as a computer mouse. A key marker on the map provides a current image of the location represented by the key marker. A key point on the map provides access to a current live video of the location represented by the key point. If a marker or point is activated by the subscriber, the method proceeds to step 440; otherwise, the method proceeds to step 445.

In step 440, the method sends a current image of the location represented by the key marker to the subscriber, if a key marker is activated. The method sends a current live video of the location represented by the key point to the subscriber, if a key point is activated. The current image is sent by the Map and Traffic Application Server using a data session to the subscriber and the current live video is sent by the Map and Traffic Application Server using a video session.

In step 445, the method checks if the method receives an alternative map and traffic route request from the subscriber. The request is received by the Map and Traffic Application Server. If a request is received, the method proceeds to step 450; otherwise, the method proceeds to step 460.

In step 450, the method determines an alternative route for the map and traffic request. The alternative route is determined by the Map and Traffic Application Server. The method proceeds back to step 430. The method ends in step 460.

Figure 5:
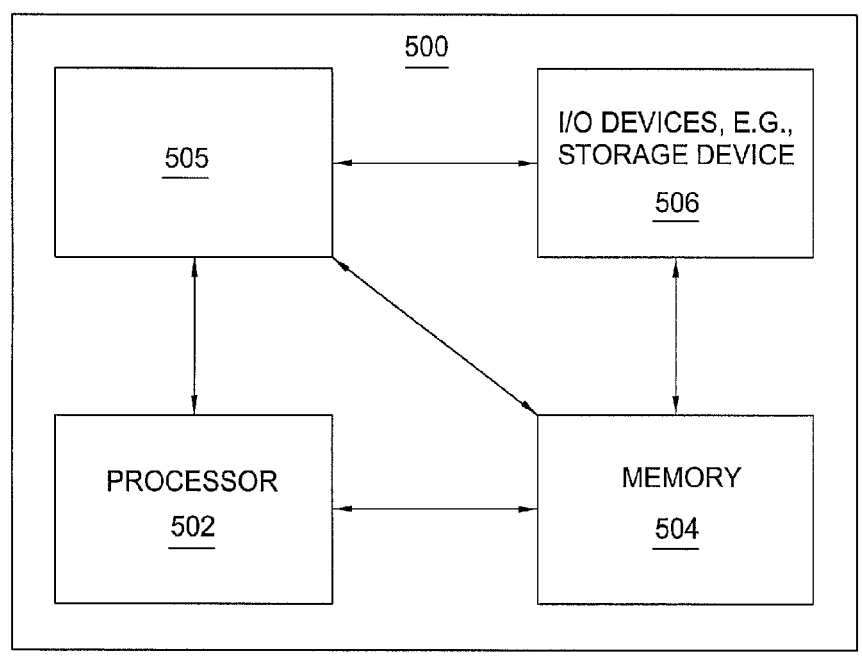
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing traffic information associated with map requests, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing traffic information associated with map requests can be loaded into memory 504 and executed by processor 502 to implement the functions as discussed above. As such, the present process 505 for providing traffic information associated with map requests (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a recommended route in a communication network, the method comprising:
 receiving, by a processor, a request from a subscriber device for establishing an application session via the communication network, where the application session is for forwarding the recommended route; and
 providing, by the processor, the recommended route to the subscriber device, where the recommended route comprises a key point representing a location along the recommended route where a live image of the location is available for viewing, wherein the providing comprises:
 receiving a source location and a destination location from the subscriber device; and
 determining the recommended route that traverses between the source location and the destination location.

2. The method of claim 1, wherein the receiving comprises receiving the request via the communication network that comprises an internet protocol network.

3. The method of claim 1, wherein the processor comprises a processor of a session controller, and wherein the receiving comprises:
 establishing the application session between a map and traffic application server and the subscriber device via the session controller.

4. The method of claim 3, wherein the recommended route is determined by the map and traffic application server.

5. The method of claim 1, further comprising:
 receiving a request from the subscriber for an alternative route.

6. The method of claim 1, wherein the application session is provided to an independent display frame on a display of the subscriber device.

7. The method of claim 1, wherein the location comprises a bridge.

8. The method of claim 1, wherein the location comprises a freeway.

9. The method of claim 1, wherein the location comprises an entry ramp.

10. The method of claim 1, wherein the location comprises an exit ramp.

11. A tangible computer-readable medium storing instructions which, when executed by a processor, cause the processor to perform operations for providing a recommended route in a communication network, the operations comprising:
 receiving a request from a subscriber device for establishing an application session via the communication network, where the application session is for forwarding the recommended route; and
 providing the recommended route to the subscriber device, where the recommended route comprises a key point representing a location along the recommended route where a live image of the location is available for viewing, wherein the providing comprises:
 receiving a source location and a destination location from the subscriber device; and
 determining the recommended route that traverses between the source location and the destination location.

12. The tangible computer-readable medium of claim 11, wherein the processor comprises a processor of a session controller, and wherein the receiving comprises:
 establishing the application session between a map and traffic application server and the subscriber device via the session controller.

13. The tangible computer-readable medium of claim 12, wherein the recommended route is determined by the map and traffic application server.

14. The tangible computer-readable medium of claim 11, further comprising:
 receiving a request from the subscriber for an alternative route.

15. The tangible computer-readable medium of claim 11, wherein the application session is provided to an independent display frame on a display of the subscriber device.

16. The tangible computer-readable medium of claim 11, wherein the location comprises a bridge.

17. The tangible computer-readable medium of claim 11, wherein the location comprises a freeway.

18. The tangible computer-readable medium of claim 11, wherein the location comprises an entry ramp.

19. The tangible computer-readable medium of claim 11, wherein the location comprises an exit ramp.

20. An apparatus for providing a recommended route in a communication network, the apparatus comprising:

a processor; and a tangible computer-readable medium storing instructions which, when executed by the processor, cause the processor to perform operations, the operations comprising:

receiving a request from a subscriber device for establishing an application session via the communication network, where the application session is for forwarding the recommended route; and providing the recommended route to the subscriber device, where the recommended route comprises a key point representing a location along the recommended route where a live image of the location is available for viewing, wherein the providing comprises:

receiving a source location and a destination location from the subscriber device; and determining the recommended route that traverses between the source location and the destination location.

* * * * *